US011334170B2

(12) United States Patent
Fan

(10) Patent No.: US 11,334,170 B2
(45) Date of Patent: May 17, 2022

(54) METHOD AND APPARATUS FOR CONTROLLING A MOBILE TERMINAL

(71) Applicant: VOLKSWAGEN AKTIENGESELLSCHAFT, Wolfsburg (DE)

(72) Inventor: Xiaoyu Fan, Beijing (CN)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/461,518

(22) PCT Filed: Nov. 21, 2016

(86) PCT No.: PCT/CN2016/106590
§ 371 (c)(1),
(2) Date: May 16, 2019

(87) PCT Pub. No.: WO2018/090368
PCT Pub. Date: May 24, 2018

(65) Prior Publication Data
US 2019/0346935 A1    Nov. 14, 2019

(51) Int. Cl.
*G06F 3/01* (2006.01)

(52) U.S. Cl.
CPC .......... *G06F 3/017* (2013.01); *B60K 2370/11* (2019.05); *B60K 2370/146* (2019.05);
(Continued)

(58) Field of Classification Search
CPC .......... B60K 2370/11; B60K 2370/577; B60K 2370/146; B60K 2370/52;
(Continued)

(56) References Cited

U.S. PATENT DOCUMENTS

2009/0103780 A1* 4/2009 Nishihara ............... G06F 3/017
382/103
2009/0195513 A1 8/2009 Dybalski et al.
(Continued)

FOREIGN PATENT DOCUMENTS

CN    102857805 A    1/2013
CN    104049727 A    9/2014
(Continued)

OTHER PUBLICATIONS

Search Report and Written Opinion for International Patent Application No. PCT/CN2016/106590; dated Jun. 5, 2017.
(Continued)

*Primary Examiner* — Pinalben Patel
(74) *Attorney, Agent, or Firm* — Barnes & Thornburg, LLP

(57) ABSTRACT

A method and an apparatus for controlling a mobile terminal. The apparatus includes a receiving module for receiving gesture information from a first mobile terminal with an image capturing device, wherein the gesture information is from a user; and a sending module for sending a particular operation instruction to a second mobile terminal whose graphic user interface is being currently displayed on a display screen of a display device to instruct the second mobile terminal to execute an operation corresponding to the particular operation instruction, wherein the particular operation instruction is related to the received gesture information.

14 Claims, 3 Drawing Sheets

(52) U.S. Cl.
CPC .................. *B60K 2370/1464* (2019.05); *B60K 2370/569* (2019.05); *B60K 2370/577* (2019.05); *B60K 2370/589* (2019.05)

(58) Field of Classification Search
CPC .......... B60K 2370/589; B60K 37/06; B60K 2370/1464; B60K 35/00; B60K 2370/569; G06F 3/0304; G06F 3/017
See application file for complete search history.

(56) References Cited

U.S. PATENT DOCUMENTS

| | | | |
|---|---|---|---|
| 2013/0155237 A1* | 6/2013 | Paek | G06F 3/048 348/148 |
| 2013/0241720 A1* | 9/2013 | Ricci | G06F 3/04886 715/765 |
| 2014/0062926 A1* | 3/2014 | Hwang | G06F 3/0412 345/173 |
| 2014/0289665 A1* | 9/2014 | Sugiura | G06F 3/017 715/778 |
| 2014/0325428 A1* | 10/2014 | Lee | G06F 3/0488 715/781 |
| 2014/0330951 A1 | 11/2014 | Sukoff et al. | |
| 2015/0178034 A1* | 6/2015 | Penilla | H04L 67/306 345/1.1 |
| 2016/0039430 A1 | 2/2016 | Ricci | |
| 2019/0079717 A1* | 3/2019 | Lee | B60K 37/06 |
| 2019/0121522 A1* | 4/2019 | Davis | H04N 9/3185 |
| 2019/0302895 A1* | 10/2019 | Jiang | G06F 3/038 |

FOREIGN PATENT DOCUMENTS

| | | |
|---|---|---|
| CN | 105151048 A | 12/2015 |
| EP | 2597838 A1 | 5/2013 |

OTHER PUBLICATIONS

Office Action for European Patent Application No. 16922006.8; dated Jan. 22, 2021.

* cited by examiner

METHOD AND APPARATUS FOR CONTROLLING A MOBILE TERMINAL

PRIORITY CLAIM

This patent application is a U.S. National Phase of International Patent Application No. PCT/CN2016/106590, filed 21 Nov. 2016, the disclosure of which is incorporated herein by reference in its entirety.

SUMMARY

Illustrative embodiments relate to a method and an apparatus for controlling a mobile terminal.

BRIEF DESCRIPTION OF THE DRAWINGS

The disclosed embodiments will become more apparent from the following detailed description made with reference to the accompanying drawings. In the drawings.

DETAILED DESCRIPTION

Figure 1:
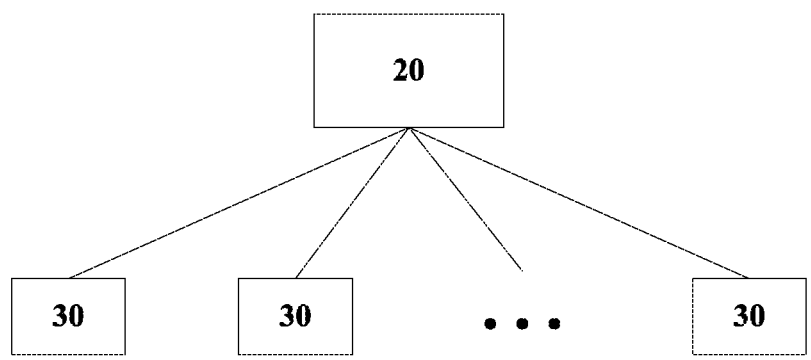
FIG. 1 illustrates an architecture diagram of a system for controlling a mobile terminal according to a disclosed embodiment.

MIRRORLINK™ is a transportation vehicle networking standard established jointly by some international well-known mobile terminal manufacturers and transportation vehicle manufacturers. With this standard, a mobile terminal may connect to a transportation vehicle terminal of a transportation vehicle via a wireless or wired communication technology such as USB, BLUETOOTH®, WiFi or the like, and a graphic user interface of the mobile terminal is sent to the transportation vehicle terminal and displayed on a display screen of the transportation vehicle terminal. Thus, a driver and passenger(s) of the transportation vehicle may operate physical buttons of the transportation vehicle terminal to control the mobile terminal (e.g., answer a call, dial number, listen music in the mobile terminal, perform navigation with the mobile terminal and the like) without watching the display screen of the mobile terminal, touching the display screen of the mobile terminal and/or operating physical buttons on the mobile terminal in the course of traveling of the transportation vehicle.

However, it is not convenient for the driver and the passenger(s) of the transportation vehicle to operate the physical buttons of the transportation vehicle terminal to control the mobile terminal because the driver or the passenger(s) must be close to the transportation vehicle terminal, locate a desired physical button of the transportation vehicle terminal he/she wants to operate, and press the desired physical button.

Disclosed embodiments provide a method and an apparatus for controlling a mobile terminal, which can improve convenience of controlling of the mobile terminal.

A method for controlling a mobile terminal according to disclosed embodiments may include receiving gesture information from a first mobile terminal with an image capturing device, wherein the gesture information is from a user; and sending a particular operation instruction to a second mobile terminal whose graphic user interface is being currently displayed on a display screen of a display device, so as to instruct the second mobile terminal to execute an operation corresponding to the particular operation instruction, wherein the particular operation instruction is related to the received gesture information.

The gesture information may include images including a particular gesture of the user, and the particular operation instruction corresponds to the particular gesture recognized from the images. The gesture information may include a particular gesture of the user that is recognized by the first mobile terminal from images captured by the image capturing device of the first mobile terminal, and the particular operation instruction corresponds to the particular gesture. The particular operation instruction may be obtained from a mapping relation between operation instructions and gestures based on the particular gesture. The gesture information may include the particular operation instruction, wherein the particular operation instruction is obtained by the first mobile terminal from a mapping relation between operation instructions and gestures based on a particular gesture of the user, and the particular gesture of the user is recognized by the first mobile terminal from images captured by the image capturing device of the first mobile terminal.

The display device may be a transportation vehicle terminal installed in a transportation vehicle.

The method may further include receiving another gesture information from the first mobile terminal; and displaying the graphic user interface of a third mobile terminal on the display screen of the display device, if an operation instruction related to the another gesture information indicates changing a mobile terminal whose graphic user interface is displayed on the display screen of the display device.

An apparatus for controlling a mobile terminal according to a disclosed embodiment may include a receiving module for receiving gesture information from a first mobile terminal with an image capturing device, wherein the gesture information is from a user; and a sending module for sending a particular operation instruction to a second mobile terminal whose graphic user interface is being currently displayed on a display screen of a display device, so as to instruct the second mobile terminal to execute an operation corresponding to the particular operation instruction, wherein the particular operation instruction is related to the received gesture information.

The gesture information may include images including a particular gesture of the user, and the particular operation instruction corresponds to the particular gesture recognized from the images. The gesture information may include a particular gesture of the user that is recognized by the first mobile terminal from images captured by the image capturing device of the first mobile terminal, and the particular operation instruction corresponds to the particular gesture. The particular operation instruction may be obtained from a mapping relation between operation instructions and gestures based on the particular gesture. The gesture information may include the particular operation instruction, the particular operation instruction is obtained by the first mobile terminal from a mapping relation between operation instructions and gestures based on a particular gesture of the user, and the particular gesture of the user is recognized by the first mobile terminal from images captured by the image capturing device of the first mobile terminal.

The display device may be a transportation vehicle terminal installed in a transportation vehicle.

The receiving module may further include receiving another gesture information from the first mobile terminal, and the apparatus further comprises a displaying module for displaying the graphic user interface of a third mobile terminal on the display screen of the display device, if an operation instruction related to the another gesture information indicates changing a mobile terminal whose graphic user interface is displayed on the display screen of the display device.

A device for controlling a mobile terminal according to disclosed embodiments may include a processor; and a memory for storing executable instructions which cause, when executed, the processor to execute operations included in the above method.

A computer program product according to disclosed embodiments may include a readable medium having executable instructions for causing, when executed, a machine to execute operations included in the above method.

In the above disclosed embodiments, the gesture information may be obtained through a mobile terminal with a camera and the operation instruction related to the obtained gesture information is sent to another mobile terminal whose human user interface is being currently displayed on the display screen of the display device so as to perform the desired operation on the another mobile terminal. Therefore, compared to the prior art, the present disclosure may improve convenience of controlling of the mobile terminal.

Various embodiments are now described with reference to the drawings, wherein like reference numerals are used to refer to like elements throughout. In the following description, for purposes of explanation, numerous specific details are set forth to provide a thorough understanding of one or more disclosed embodiments. However, it may be evident that such disclosed embodiment(s) can be practiced without these specific details.

FIG. 1 illustrates an architecture diagram of a system for controlling a mobile terminal according to a disclosed embodiment. As shown in FIG. 1, the system 10 may include a transportation vehicle terminal 20 and multiple mobile terminals 30.

The transportation vehicle terminal 20 may be installed on the central operation panel at the front of a transportation vehicle. The transportation vehicle terminal 20 may include a display screen for displaying a human machine interface. The transportation vehicle terminal 20 may be a car computer, a navigator or the like.

The multiple mobile terminals 30 are portable electronic devices held by the driver and/or the passenger, each of which has a display screen for displaying a human machine interface and may be a mobile phone, a laptop computer, a tablet or the like. At least one of the multiple mobile terminals 30 is equipped with a camera as an image capturing device. Through a suitable transportation vehicle networking standard such as MIRRORLINK™ or the like, the multiple mobile terminals 30 may connect to the transportation vehicle terminal 20 via a wired or wireless communication technology such USB, BLUETOOTH®, WiFi or the like, and the human machine interface of a selected one of the multiple mobile terminals 30 is displayed on the display screen of the transportation vehicle terminal 20. A particular mobile terminal 30k equipped with the camera may capture a gesture of the driver or the passenger(s) and the transportation vehicle terminal 20 may send a particular operation instruction associated with the captured gesture to another mobile terminal 30t whose human machine interface is being displayed on the display screen of the transportation vehicle terminal 20 so as to instruct the mobile terminal 30t to execute an operation corresponding to the particular operation instruction, which will he described in details below.

Figure 2:
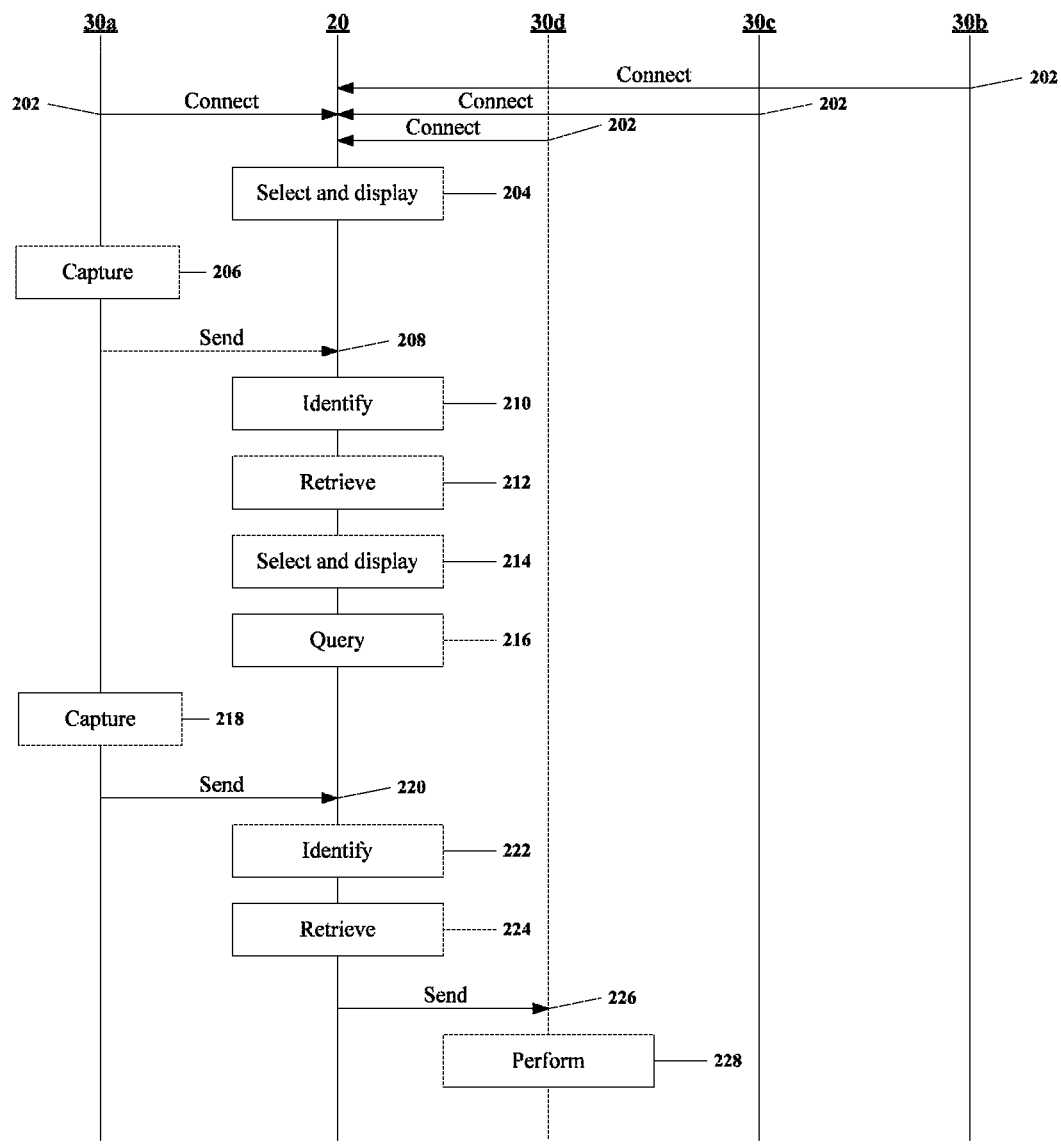
FIG. 2 illustrates a flowchart of a method for controlling a mobile terminal according to a disclosed embodiment.

FIG. 2 illustrates a flowchart of a method for controlling a mobile terminal according to a disclosed embodiment. Here, mobile terminals 30a, 30b, 30c and 30d are taken as examples of the mobile terminals 30, and it is assumed that the mobile terminal 30a is equipped with a camera and is used to assist to control other mobile terminals in a transportation vehicle.

As shown in FIG. 2, at block 202, when the mobile terminals 30a, 30b, 30c and 30d are carried by user(s) of the transportation vehicle Q (e.g., the driver and/or the passengers of the transportation vehicle Q) into the transportation vehicle Q and the transportation vehicle terminal 20 of the transportation vehicle Q is powered on, the mobile terminals 30a, 30b, 30c and 30d are connected to the transportation vehicle terminal 20 of the transportation vehicle Q based on the transportation vehicle networking standard.

At block 204, the transportation vehicle terminal 20 of the transportation vehicle Q may select a mobile terminal 30-i from the mobile terminals 30b, 30c and 30d and display the human user interface of the selected mobile terminal 30-i on the display screen of the transportation vehicle terminal 20 of the transportation vehicle Q. The selection at block 204 may implemented at any suitable manner. For example, a mobile terminal that is connected first or finally to the transportation vehicle terminal 20 of the transportation vehicle Q among the mobile terminals 30b, 30c and 30d is selected, a mobile terminal that has a predetermined feature among the mobile terminals 30a, 30b, 30c and 30d is selected, or the like.

If the mobile terminal 30-i is not the mobile terminal the user(s) of the transportation vehicle Q desires to display its human user interface on the display screen of the transportation vehicle terminal 20 of the transportation vehicle Q, the user(s) of the transportation vehicle Q may use his/her hand to present, in front of the camera of the mobile terminal 30a, a gesture G1 corresponding to an operation for changing a mobile terminal whose human user interface is displayed on the display screen of the transportation vehicle terminal 20 of the transportation vehicle Q.

At block 206, the mobile terminal 30a may capture, by its camera, images including the gesture G1. The images including the gesture G1 serve as gesture information.

At block 208, the mobile terminal 30a may send the captured images to the transportation vehicle terminal 20 of the transportation vehicle Q.

At block 210, upon receiving the images from the mobile terminal 30a, the transportation vehicle terminal 20 of the transportation vehicle Q may identify the gesture G1 included in the received images, for example, through an image recognition technology.

At block 212, the transportation vehicle terminal 20 of the transportation vehicle Q may retrieve, from a mapping relation between gestures and operation instructions stored in the transportation vehicle terminal 20 of the transportation vehicle Q, an operation instruction mapped to the identified gesture G1. Wherein a gesture and an operation instruction, which are mapped each other in the mapping relation, correspond to the same operation. As stated above, the identified gesture G1 corresponds to the operation for changing the mobile terminal whose human user interface is displayed on the display screen of the transportation vehicle terminal 20 of the transportation vehicle Q, so the retrieved operation instruction mapped to the identified gesture G1 also corresponds to the operation for changing the mobile terminal whose human user interface is displayed on the display screen of the transportation vehicle terminal 20 of the transportation vehicle Q. Wherein, the mapping relation between gestures and operation instructions may be generated and stored in the transportation vehicle terminal 20 of the transportation vehicle Q in advance by the user(s) of the transportation vehicle Q or by the manufacturer of the transportation vehicle Q.

At block 214, since the retrieved operation instruction corresponds to the operation for changing the mobile terminal whose human user interface is displayed on the display screen of the transportation vehicle terminal 20 of the transportation vehicle Q, the transportation vehicle terminal 20 of the transportation vehicle Q may select, from the mobile terminals 30b, 30c and 30d, another mobile terminal 30-j whose human user interface is not being currently displayed on the display screen of the transportation vehicle terminal 20 of the transportation vehicle Q, and display the human user interface of the selected another mobile terminal 30-j on the display screen of the transportation vehicle terminal 20 of the transportation vehicle Q.

At block 216, the transportation vehicle terminal 20 of the transportation vehicle Q may query whether the mobile terminal 30-j is the mobile terminal the user(s) of the transportation vehicle Q desires to display its human user interface on the display screen of the transportation vehicle terminal 20 of the transportation vehicle Q.

If the mobile terminal 30-j is not the mobile terminal the user(s) of the transportation vehicle Q desires to display its human user interface on the display screen of the transportation vehicle terminal 20 of the transportation vehicle Q, the user(s) of the transportation vehicle Q may use his/her hand to present, in front of the camera of the mobile terminal 30a, the gesture G1 corresponding to the operation for changing a mobile terminal whose human user interface is displayed on the display screen of the transportation vehicle terminal 20 of the transportation vehicle Q and the method may then go back to block 206.

If the mobile terminal 30-i or 30-j is the mobile terminal the user(s) of the transportation vehicle Q desires to display its human user interface on the display screen of the transportation vehicle terminal 20 of the transportation vehicle Q, and the user(s) of the transportation vehicle Q wants to perform a particular operation on the mobile terminal whose human user interface is being currently displayed on the display screen of the transportation vehicle terminal 20 of the transportation vehicle Q, the user(s) of the transportation vehicle Q may use his/her hand to present, in front of the camera of the mobile terminal 30a, a gesture G2 corresponding to the particular operation. For example, the particular operation may be answering a call, dialing number, listening music, performing navigation, going to the previous song, going to the next song or the like.

At block 218, the mobile terminal 30a may capture, by its camera, images including the gesture G2.

At block 220, the mobile terminal 30a may send the captured images to the transportation vehicle terminal 20 of the transportation vehicle Q.

At block 222, upon receiving the images from the mobile terminal 30a, the transportation vehicle terminal 20 of the transportation vehicle Q may identify the gesture G2 included in the received images, for example, through an image recognition technology.

At block 224, the transportation vehicle terminal 20 of the transportation vehicle Q may retrieve, from the mapping relation between gestures and operation instructions stored in the transportation vehicle terminal 20 of the transportation vehicle Q, an operation instruction mapped to the identified gesture G2. Since the identified gesture G2 corresponds to the particular operation, the retrieved operation instruction also corresponds to the particular operation.

At block 226, the transportation vehicle terminal 20 of the transportation vehicle Q may send the retrieved operation instruction to the mobile terminal whose human user interface is being currently displayed on the display screen of the transportation vehicle terminal 20 of the transportation vehicle Q. Here, for purpose of simplicity, it is assumed that the mobile terminal whose human user interface is being currently displayed on the display screen of the transportation vehicle terminal 20 of the transportation vehicle Q is the mobile terminal 30d.

At block 228, upon receiving the operation instruction from the transportation vehicle terminal 20 of the transportation vehicle Q, the mobile terminal 30d may perform an operation corresponding to the received operation instruction.

It can be seen from the above description that in the above disclosed embodiment, the transportation vehicle terminal of the transportation vehicle may obtain the gesture of the user(s) of the transportation vehicle through a mobile terminal with the camera and send the operation instruction corresponding to the obtained gesture to another mobile terminal whose human user interface is being currently displayed on the display screen of the transportation vehicle terminal of the transportation vehicle so as to perform the desired operation on the another mobile terminal, which does not require the user(s) of the transportation vehicle to be close to the transportation vehicle terminal, locate a desired physical button of the transportation vehicle terminal and press the desired physical button. Therefore, convenience of controlling of the mobile terminal is improved compared to the prior art.

Other Modifications

Those skilled in the art will understand that in the above disclosed embodiment, the gesture information sent by the mobile terminal to the transportation vehicle terminal 20 is the images including the gesture of the user, but the present disclosure is not so limited. In other disclosed embodiments, the gesture information sent by the mobile terminal to the transportation vehicle terminal 20 may also be the gesture of the user, wherein the gesture of the user is recognized by the mobile terminal from the captured images.

Those skilled in the art will understand that in the above disclosed embodiment, the gesture information sent by the mobile terminal to the transportation vehicle terminal 20 is the images including the gesture of the user, but the present disclosure is not so limited. In other disclosed embodiments, the gesture information sent by the mobile terminal to the transportation vehicle terminal 20 may also be an operation instruction, wherein the operation instruction is obtained by the mobile terminal from a mapping relation between operation instructions and gestures stored in the mobile terminal based on the gesture of the user, and the gesture of the user is recognized by the mobile terminal from the captured images.

Those skilled in the art will understand that in the above disclosed embodiment, the displaying device for displaying the human user interface of the mobile terminal is the transportation vehicle terminal 20 installed in the transportation vehicle, but the present disclosure is not so limited. In other disclosed embodiments, the displaying device for displaying the human user interface of the mobile terminal may also be any suitable device other than the transportation vehicle terminal 20.

Figure 3:
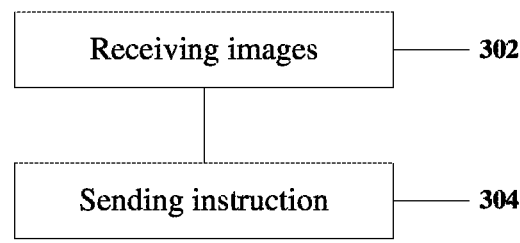
FIG. 3 illustrates a flowchart of a method for controlling a mobile terminal according to a disclosed embodiment.

FIG. 3 illustrates a flowchart of a method for controlling a mobile terminal according to a disclosed embodiment.

As shown in FIG. 3, the method 300 may include, at block 302, receiving gesture information from a first mobile terminal with an image capturing device, wherein the gesture information is from a user.

The method 300 may also include, at block 304, sending a particular operation instruction to a second mobile terminal whose graphic user interface is being currently displayed on a display screen of a display device, so as to instruct the second mobile terminal to execute an operation corresponding to the particular operation instruction, wherein the particular operation instruction is related to the received gesture information.

In a first disclosed embodiment, the gesture information is images including a particular gesture of the user, and the particular operation instruction corresponds to the particular gesture recognized from the images.

In a second disclosed embodiment, the gesture information is a particular gesture of the user that is recognized by the first mobile terminal from images captured by the image capturing device of the first mobile terminal, and the particular operation instruction corresponds to the particular gesture.

In a third disclosed embodiment, the particular operation instruction is obtained from a mapping relation between operation instructions and gestures based on the particular gesture.

In a fourth disclosed embodiment, the gesture information is the particular operation instruction, the particular operation instruction is obtained by the first mobile terminal from a mapping relation between operation instructions and gestures based on a particular gesture of the user, and the particular gesture of the user is recognized by the first mobile terminal from images captured by the image capturing device of the first mobile terminal.

In a fifth disclosed embodiment, the display device is a transportation vehicle terminal installed in a transportation vehicle.

In a sixth disclosed embodiment, the method 300 may also include: receiving another gesture information from the first mobile terminal; and displaying the graphic user interface of a third mobile terminal on the display screen of the display device, if an operation instruction related to the another gesture information indicates changing a mobile terminal whose graphic user interface is displayed on the display screen of the display device.

Figure 4:
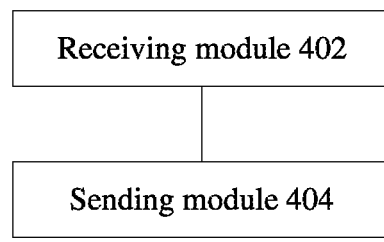
FIG. 4 illustrates a schematic diagram of an apparatus for controlling a mobile terminal according to a disclosed embodiment.

FIG. 4 illustrates a schematic diagram of an apparatus for controlling a mobile terminal according to a disclosed embodiment. The apparatus 400 shown in FIG. 4 may be implemented by software, hardware or combination of software and hardware.

As shown in FIG. 4, the apparatus 400 may include a receiving module 402 and a sending module 404. The receiving module 402 is configured for receiving gesture information from a first mobile terminal with an image capturing device, wherein the gesture information is from a user. The sending module 408 is configured for sending a particular operation instruction to a second mobile terminal whose graphic user interface is being currently displayed on a display screen of a display device, so as to instruct the second mobile terminal to execute an operation corresponding to the particular operation instruction, wherein the particular operation instruction is related to the received gesture information.

In a first disclosed embodiment, the gesture information is images including a particular gesture of the user, and the particular operation instruction corresponds to the particular gesture recognized from the images.

In a second disclosed embodiment, the gesture information is a particular gesture of the user that is recognized by the first mobile terminal from images captured by the image capturing device of the first mobile terminal, and the particular operation instruction corresponds to the particular gesture.

In a third disclosed embodiment, the particular operation instruction is obtained from a mapping relation between operation instructions and gestures based on the particular gesture.

In a fourth disclosed embodiment, the gesture information is the particular operation instruction, the particular operation instruction is obtained by the first mobile terminal from a mapping relation between operation instructions and gestures based on a particular gesture of the user, and the particular gesture of the user is recognized by the first mobile terminal from images captured by the image capturing device of the first mobile terminal.

In a fifth disclosed embodiment, the display device is a transportation vehicle terminal installed in a transportation vehicle.

In a sixth disclosed embodiment, the receiving module 402 may be further configured for receiving another gesture information from the first mobile terminal, and the apparatus 400 may further include a displaying module for displaying the graphic user interface of a third mobile terminal on the display screen of the display device, if an operation instruction related to the another gesture information indicates changing a mobile terminal whose graphic user interface is displayed on the display screen of the display device.

Figure 5:
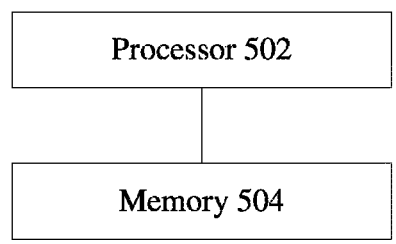
FIG. 5 illustrates a schematic diagram of a device for controlling a mobile terminal according to a disclosed embodiment.

FIG. 5 illustrates a schematic diagram of a device for controlling a mobile terminal according to a disclosed embodiment. As shown in FIG. 5, the device 500 may include a processor 502 and a memory 504. The memory 504 may store executable instructions which cause, when executed, the processor 502 to execute operations included in the method 300 shown in FIG. 3.

Disclosed embodiments may provide a computer program product including a machine-readable medium that comprises codes for causing a machine to execute operations included in the method 300 shown in FIG. 3.

Other embodiments and modifications will be apparent to those having ordinary skill in the art upon consideration of the specification and practice disclosed herein. The specification and examples given should be considered exemplary only, and it is contemplated that the appended claims will cover any other such embodiments or modifications as fall within the true scope of the disclosure.

The invention claimed is:

1. A method for controlling functionality of a terminal installed in a transportation vehicle and one or more mobile terminals located within the transportation vehicle using interaction between the transportation vehicle terminal and one or more of the one or more mobile terminals located within the transportation vehicle, the method comprising:

receiving gesture information at the transportation vehicle terminal from a first mobile terminal of the one or more mobile terminals, wherein the gesture information has been captured using an image capturing device of the first mobile terminal, and wherein the gesture information pertains to a gesture made by a user;

analyzing the gesture information to identify a particular operation instruction; and sending, by the transportation vehicle terminal, the particular operation instruction to a second mobile terminal of the one or more mobile terminals, wherein graphic user interface content of the second mobile terminal is being currently displayed on a display of the transportation vehicle terminal, wherein the particular operation instruction instructs the second mobile terminal to execute an operation corresponding to the particular operation instruction, and wherein the particular operation instruction is related to the received gesture information and pertains to both the execution of the operation corresponding to the particular operation instruction and to the graphic user interface content displayed on the display of the second mobile terminal such that the analysis of the gesture captured by the first mobile terminal controls subsequent display of the second mobile terminal's graphic user interface content on the display of the transportation vehicle terminal.

2. The method of claim 1, wherein the gesture information is images including a particular gesture of the user, and the particular operation instruction corresponds to the particular gesture recognized from the images.

3. The method of claim 2, wherein the particular operation instruction is identified from a mapping relation between operation instructions and gestures based on the particular gesture.

4. The method of claim 1, wherein the gesture information is a particular gesture of the user that is recognized by the first mobile terminal from images captured by the image capturing device of the first mobile terminal, and the particular operation instruction corresponds to the particular gesture.

5. The method of claim 1, wherein
the gesture information is the particular operation instruction,
the particular operation instruction is identified by the first mobile terminal from a mapping relation between operation instructions and gestures based on a particular gesture of the user, and
the particular gesture of the user is recognized by the first mobile terminal from images captured by the image capturing device of the first mobile terminal.

6. The method of claim 1, further comprising:
receiving another gesture information from the first mobile terminal; and
displaying the graphic user interface of a third mobile terminal on the display of the display device of the transportation vehicle in response to an operation instruction related to the another gesture information indicating changing a mobile terminal whose graphic user interface is displayed on the display of the display device of the transportation vehicle.

7. An apparatus for controlling functionality of a terminal installed in a transportation vehicle and one or more mobile terminals located within the transportation vehicle using interaction between the transportation vehicle terminal and one or more of the one or more mobile terminals located within the transportation vehicle, the apparatus comprising:
a receiving module for receiving gesture information at the transportation vehicle terminal from a first mobile terminal of the one or more mobile terminals, wherein the gesture information has been captured using an image capturing device, wherein the gesture information pertains to a gesture made by a user; and
a sending module for sending, by the transportation vehicle terminal, a particular operation instruction to a second mobile terminal of the one or more mobile terminals following analysis of the gesture information to identify the particular operation instruction, wherein graphic user interface content of the second mobile terminal is being currently displayed on a display of the transportation vehicle terminal, wherein the particular operation instruction instructs the second mobile terminal to execute an operation corresponding to the particular operation instruction, and wherein the particular operation instruction is related to the received gesture information and pertains to both the execution of the operation corresponding to the particular operation instruction and to the graphic user interface content displayed on the display of the second mobile terminal such that the analysis of the gesture captured by the first mobile terminal controls subsequent display of the second mobile terminal's graphic user interface content on the display of the transportation vehicle terminal.

8. The apparatus of claim 7, wherein the gesture information is images including a particular gesture of the user, and the particular operation instruction corresponds to the particular gesture recognized from the images.

9. The apparatus of claim 8, wherein the particular operation instruction is identified from a mapping relation between operation instructions and gestures based on the particular gesture.

10. The apparatus of claim 7, wherein
the gesture information is a particular gesture of the user that is recognized by the first mobile terminal from images captured by the image capturing device of the first mobile terminal, and
the particular operation instruction corresponds to the particular gesture.

11. The apparatus of claim 7, wherein
the gesture information is the particular operation instruction,
the particular operation instruction is identified by the first mobile terminal from a mapping relation between operation instructions and gestures based on a particular gesture of the user, and
the particular gesture of the user is recognized by the first mobile terminal from images captured by the image capturing device of the first mobile terminal.

12. The apparatus of claim 7, wherein
the receiving module is further configured for receiving another gesture information from the first mobile terminal, and
the apparatus further comprises a displaying module for displaying the graphic user interface of a third mobile terminal on the display of the display device, in response to an operation instruction related to the another gesture information indicating changing a mobile terminal whose graphic user interface is displayed on the display of the display device.

13. A device for controlling functionality of a terminal installed in a transportation vehicle and one or more mobile terminals in the transportation vehicle using interaction between the transportation vehicle terminal and one or more of the one or more mobile terminals in the transportation vehicle, the device comprising:

a processor; and a memory for storing executable instructions which, when executed, cause the processor to execute operations included in a method for controlling a mobile terminal, the method comprising:

receiving gesture information at the transportation vehicle terminal from a first mobile terminal of the one or more mobile terminals, wherein the gesture information has been captured using an image capturing device of the first mobile terminal, and wherein the gesture information pertains to a gesture made by a user; and analyzing the gesture information to identify a particular operation instruction;

sending, by the transportation vehicle terminal, the particular operation instruction to a second mobile terminal of the one or more mobile terminals, wherein graphic user interface content of the second mobile terminal is being currently displayed on a display of the transportation vehicle terminal, wherein the particular operation instruction instructs the second mobile terminal to execute an operation corresponding to the particular operation instruction, and wherein the particular operation instruction is related to the received gesture information and pertains to both the execution of the operation corresponding to the particular operation instruction and to the graphic user interface content displayed on the display of the second mobile terminal such that the analysis of the gesture captured by the first mobile terminal controls subsequent display of the second mobile terminal's graphic user interface content on the display of the transportation vehicle terminal.

14. A non-transitory computer program product including a computer-readable medium having executable instructions for causing, when executed, a machine to execute operations included in a method for controlling functionality of a terminal installed in a transportation vehicle and one or more mobile terminals located within the transportation vehicle using interaction between the transportation vehicle terminal and one or more of the one or more mobile terminals located within the transportation vehicle, the method comprising:

receiving gesture information at the transportation vehicle terminal from a first mobile terminal of the one or more mobile terminals, wherein the gesture information has been captured using an image capturing device of the first mobile terminal, and wherein the gesture information pertains to a gesture made by a user; and analyzing the gesture information to identify a particular operation instruction;

sending, by the transportation vehicle terminal, the particular operation instruction to a second mobile terminal of the one or more mobile terminals, wherein graphic user interface content of the second mobile terminal is being currently displayed on a display of the transportation vehicle terminal, wherein the particular operation instruction instructs the second mobile terminal to execute an operation corresponding to the particular operation instruction, and wherein the particular operation instruction is related to the received gesture information and pertains to both the execution of the operation corresponding to the particular operation instruction and to the graphic user interface content displayed on the display of the second mobile terminal such that the analysis of the gesture captured by the first mobile terminal controls subsequent display of the second mobile terminal's graphic user interface content on the display of the transportation.

* * * * *